(12) United States Patent
Celerier

(10) Patent No.: US 10,850,870 B1
(45) Date of Patent: Dec. 1, 2020

(54) OPTIMIZED PROPULSION DEVICE FOR CONTROLLING THE ORBIT AND ATTITUDE OF A SATELLITE

(71) Applicant: THALES, Neuilly-sur-Seine (FR)

(72) Inventor: Bruno Celerier, Cannes la Bocea (FR)

(73) Assignee: THALES, Courbevoie (FR)

( * ) Notice: Subject to any disclaimer, the term of this patent is extended or adjusted under 35 U.S.C. 154(b) by 2207 days.

(21) Appl. No.: 14/067,753

(22) Filed: Oct. 30, 2013

(30) Foreign Application Priority Data

Oct. 31, 2012 (FR) ...................... 12 02936

(51) Int. Cl.
*B64G 1/26* (2006.01)
(52) U.S. Cl.
CPC ...................... *B64G 1/26* (2013.01)
(58) Field of Classification Search
CPC .......... B64G 1/288; B64G 1/361; B64G 1/26; B64G 1/24; B64G 1/405; B64G 1/44; B64G 1/443
See application file for complete search history.

(56) References Cited

U.S. PATENT DOCUMENTS

| | | | | |
|---|---|---|---|---|
| 4,407,469 A * | 10/1983 | Fox | .......................... | B64G 1/26 244/169 |
| 4,725,024 A * | 2/1988 | Vorlicek | ................. | B64G 1/244 244/164 |
| 5,458,300 A * | 10/1995 | Flament | ................... | B64G 1/24 244/169 |
| 5,562,266 A * | 10/1996 | Achkar | ..................... | B64G 1/24 244/171 |
| 6,032,904 A * | 3/2000 | Hosick | ..................... | B64G 1/26 244/169 |
| 6,637,701 B1 * | 10/2003 | Glogowski | ............ | B64G 1/242 244/169 |
| 2007/0080859 A1 * | 4/2007 | Tekawy | ................... | G01S 19/02 342/358 |
| 2009/0078829 A1 | 3/2009 | Ho et al. | | |
| 2012/0206045 A1 * | 8/2012 | Marchandise | ........ | F03H 1/0012 315/111.41 |

(Continued)

FOREIGN PATENT DOCUMENTS

| EP | 0568209 A1 | 11/1993 |
|---|---|---|
| EP | 0 780 299 A1 | 6/1997 |

(Continued)

*Primary Examiner* — Assres H Woldemaryam
(74) *Attorney, Agent, or Firm* — BakerHostetler

(57) ABSTRACT

A propulsion device for controlling the orbit of an earth-orbit satellite including a structure of which the orientation is maintained constant in relation to the Earth in an operational configuration of the satellite in the orbit; a center of mass of the satellite being contained in the structure of the satellite, includes two thrusters suitable for delivering a thrust according to one axis, and fixed to the structure of the satellite in the same half-space separated by the plane of the orbit. The thrusters are arranged on either side of a plane containing the center of mass and perpendicular to a Z-axis; the thrusters being configured in such a way that a force resulting from the thrusts of the two simultaneously activated thrusters represents a principal component according to a Y-axis of the satellite oriented perpendicular to the orbit.

16 Claims, 4 Drawing Sheets

(56) References Cited

U.S. PATENT DOCUMENTS

2013/0313369 A1* 11/2013 Celerier .................... F02K 9/84
 244/158.6
2014/0061386 A1* 3/2014 Peterka .................. B64G 1/002
 244/171.5
2014/0097981 A1* 4/2014 Celerier ............... B64G 1/1007
 342/352

FOREIGN PATENT DOCUMENTS

| | | |
|---|---|---|
| EP | 0 922 635 A1 | 6/1999 |
| EP | 0 937 644 A2 | 8/1999 |
| JP | H10 278898 A | 10/1998 |
| NL | 1 032 158 C2 | 1/2008 |

* cited by examiner

OPTIMIZED PROPULSION DEVICE FOR CONTROLLING THE ORBIT AND ATTITUDE OF A SATELLITE

CROSS-REFERENCE TO RELATED APPLICATIONS

This application claims priority to foreign French patent application No. FR 1202936, filed on Oct. 31, 2012.

FIELD OF THE INVENTION

The present invention relates to the field of systems for controlling the orbit and attitude of a satellite, and more particularly the architecture of on-board propulsion systems for controlling the orbit of geostationary telecommunications satellites.

BACKGROUND

An attitude and orbit control system (AOCS) is an assembly of on-board equipment and software for controlling a spacecraft to impose the required attitude on it and adjust its orbit according to the requirements of the mission. In the case of a geostationary telecommunications satellite, attitude control seeks to orient the satellite in a constant manner in relation to the Earth to enable the operation of various mission instruments; orbit control seeks to maintain the position of the satellite in a predefined zone around an ideal position in the ideal geostationary orbit.

An AOCS system generally includes various sensors to define the attitude and position of the satellite, actuators such as propulsion devices and angular momentum accumulation devices to modify the position and attitude of the satellite, and flight software which controls the orientation and maintenance of the orbit in the different life phases of the satellite. Orbit control therefore consists in defining the position of the satellite, notably via the six orbital parameters (semi-major axis, eccentricity, inclination, argument of the ascending node, argument of the perigee, true anomaly), and in performing the necessary operations by means of the on-board propulsion systems. It is thus known to have thrusters at various places on the satellite to correct the trajectory at more or less short intervals by applying a force to the satellite. These station-keeping operations require the capability to have a sufficient fuel reserve throughout the life of the satellite.

A satellite is generally made up of a so-called mission sub-assembly of equipment and software, such as telecommunications or observation systems, and a so-called service sub-assembly which brings together the equipment and software necessary for the correct operation of the satellite, and the separation from the launcher at the end of life of the satellite. FIG. 1 shows the service equipment of a satellite with a current architecture including a parallelepiped structure. Solar generators 11 are fixed to the structure of the satellite to supply the satellite with electric power during the entire life of the satellite. An attitude and orbit control system AOCS also forms part of the service equipment. An AOCS system includes in particular an assembly of sensors 12, a propulsion device 13 including a plurality of thrusters 13a, 13b, 13c and 13d, and an angular momentum accumulation device 15.

The role of the assembly of sensors 12 is to define the attitude and position of the satellite, for example by means of Earth sensors, sun sensors or other sensors enabling variations in position or attitude to be measured (gyrometers, accelerometers). The assembly of sensors 12 provides an estimation of the position and attitude of the satellite in the three directions of space.

The propulsion device 13 generally includes a plurality of thrusters fixed at various places on the structure of the satellite. In delivering a thrust in the direction of the center of mass of the satellite, the propulsion device corrects the trajectory and modifies the position of the satellite and its orbit. Orbit control thus operates by regularly correcting the trajectory of the satellite according to a plurality of directions and for various positions of the satellite in its orbit.

An AOCS system also makes use of an angular moment accumulation device 15, such as, for example, an assembly of reaction wheels, inertia wheels or gyroscopic actuators. An electric motor causes an inertia wheel to rotate according to one axis of the satellite, a variation in the speed of rotation generating a torque which, by reaction, causes the satellite to rotate around its center of mass. An angular momentum accumulation device 15 including three reaction wheels (or four wheels for redundancy) stabilizes and controls the attitude according to the three axes of the satellite. It is understood that the operation of the propulsion device 13 and of the angular momentum accumulation device 15 is strongly linked. A thrust applied slightly outside the center of mass generates both a modification of the trajectory of the satellite and a torque enabling, for example, the reaction wheels to be desaturated while maintaining the attitude of the satellite.

The tasks to be performed by a satellite propulsion device include the orbit control, a contribution to the attitude control, and also the transfer from the launch orbit to the mission orbit.

To perform these tasks, a first type of thruster is known, referred to as a chemical thruster, which consumes a chemical fuel of the propellant type. It delivers a powerful thrust but has a relatively high consumption which entails taking on-board a punitive amount of fuel. In a second type of thruster, referred to as a plasma thruster or electric thruster, xenon atoms are ionized through collision with electrons. The thrust is generated when the charged xenon ions are accelerated outside the thruster by an electromagnetic field. Although expensive and having a substantial initial mass, the efficiency of the thruster is substantially greater than that of the chemical thruster.

It must be noted that in most known propulsion systems for orbit control, the different on-board thrusters in reality include two propulsion engines positioned side-by-side, for reasons of safety and reliability of the mission. This redundancy, well known to the person skilled in the art, is not shown in the figures, but it is considered below that a thruster may be made up of one or more propulsion engines forming a propulsion assembly, of which the thrust that can be delivered is identical, in orientation or in intensity.

A reference axis system linked to the satellite, commonly used by the person skilled in the art, will be used below. This reference axis system includes a Z-axis directed towards the Earth in an operational configuration of the satellite in its orbit, also referred to as the yaw axis, a Y-axis perpendicular to the orbit and oriented in the opposite direction to the angular momentum of the orbit (towards the south for a geostationary orbit), also referred to as the pitch axis, and an X-axis forming with Y and Z a direct orthogonal reference, also referred to as the roll axis, which is oriented according to the speed in the case of circular orbits.

The names known to the person skilled in the art will also be used for the faces of the parallelepiped structure of the satellite, including the Earth face 20, the anti-Earth face 21, the North face 22, the South face 23, the East face 24, and the West face 25; these names are logically derived from the orientation of the parallelepiped structure of the satellite in its orbit in relation to the Earth, as shown in FIG. 1.

The propulsion device 13 generally includes a first thruster, referred to as the main satellite thruster PSP, fixed to the structure by the anti-Earth face, one of the tasks of which is to provide the thrust necessary for the transfer from the launch orbit to the mission orbit. A propellant-based chemical thruster is generally chosen for this thruster.

The propulsion device 13 also includes two thrusters 13a and 13b respectively positioned close to the edge common to the North and anti-Earth faces, and close to the edge common to the South and anti-Earth faces. These two thrusters 13a and 13b are configured to direct their respective thrusts towards the center of mass of the satellite. According to a technique known to the person skilled in the art, an inclination correction maneuver consists in igniting the thruster 13a close to a first orbital node, in this case the ascending node, then in igniting the thruster 13b close to the opposite orbital node, the descending node. The thrust of the first ignition, oriented towards the center of mass, moves the satellite in a direction having a Z component and a Y component. On the opposite orbital node, twelve hours later in the case of a geostationary orbit, the thrust of the second ignition moves the satellite in a direction having a Z component opposite to the first ignition, compensating for the unwanted effect on eccentricity and a similarly opposite Y component, but of which the sought inclination effects accumulate. Thus, two ignitions of equal intensities performed twelve hours apart close to the orbital nodes cancel out the effect on eccentricity of the radial component to leave only a slight variation in the mean longitude—which can be compensated as a mean value by a suitable choice of the semi-major axis of the orbit—and retain a North-South correction. This known procedure corrects the inclination, typically on a daily basis.

By this same technique, it is also possible, by applying a second thrust with an intensity differing from the first, to apply eccentricity corrections according to an axis perpendicular to an axis joining the two orbital nodes. Techniques have also been developed to enable eccentricity corrections according to a second axis, by shifting the ignition of the thruster in relation to the orbital node, but at the cost of a reduced effectiveness of the inclination control. To summarize, the thrusters 13a and 13b are known from the prior art for controlling inclination and eccentricity according to one axis without deoptimizing the inclination control, or for controlling inclination and eccentricity according to two axes without deoptimizing the inclination control.

Drift control cannot be implemented by these two thrusters 13a and 13b, except by orienting the thrusts for this purpose and being subject to undesirable torques in return. For drift control, the propulsion device 13 includes thrusters 13c and 13d fixed on the East face, and also thrusters (not visible in FIG. 1) fixed on the West face.

Inclination control requires more fuel than eccentricity and drift control. For this reason, the inclination control is generally implemented by means of thrusters 13a and 13b of the plasma thruster type, with a lower fuel consumption, whereas thrusters dedicated to eccentricity and drift control are often of the chemical thruster type.

The importance of being able to have efficient propulsion devices is therefore understood. Current solutions suffer from limits which the present invention seeks to resolve, in particular for inclination correction. As described, the thrusters 13a and 13b implemented for this correction need to be able to orient the thrust in the direction of the center of mass. Since the center of mass of the satellite changes during the life of the satellite, due to fuel consumption, for example, any imprecision in the estimation of its position reduces the effectiveness of the correction. Furthermore, for a satellite platform of which the center of mass is distanced from the anti-Earth face, the effectiveness of the inclination correction by means of thrusters arranged close to the anti-Earth face is substantially reduced. In other words, the successive movements of the satellite according to the Z-axis which mutually compensate one another represent a substantial and unnecessary fuel consumption. Current propulsion devices have a limited efficiency, in the order of around 50% for the most recent satellite platforms.

SUMMARY OF THE INVENTION

The invention aims to propose an alternative solution for the orbit control and the implementation of the torques to be exerted on the satellite during maneuvers by overcoming the aforementioned implementation difficulties. In order to limit the cost and mass of the propulsion devices, and to improve the effectiveness of the orbit control, a new architecture of the propulsion systems is envisaged.

For this purpose, the subject-matter of the invention is a propulsion device for controlling the orbit of an earth-orbit satellite including a structure of which the orientation is maintained constant in relation to the Earth in an operational configuration of the satellite in orbit; a center of mass of the satellite being contained in the structure of the satellite. The propulsion device includes two thrusters suitable for delivering a thrust according to one axis, and fixed to the structure of the satellite in the same half-space separated by the plane of the orbit. The thrusters are arranged on the structure on either side of the center of mass according to a Z-axis of the satellite oriented towards the Earth; the thrusters being configured in such a way that a force resulting from the thrusts of the two simultaneously activated thrusters presents a principal component according to a Y-axis of the satellite oriented perpendicular to the orbit.

The invention also relates to a geostationary-orbit satellite including a propulsion device having the characteristics previously described.

The invention finally relates to a method for controlling the orbit inclination for a geostationary satellite including a propulsion device having the characteristics previously described, comprising a step consisting in simultaneously activating the two thrusters to perform a correction of the inclination of the orbit of the satellite.

BRIEF DESCRIPTION OF THE DRAWINGS

The invention will be better understood and other advantages will become evident from a reading of the detailed description of the embodiments given by way of example in the following figures.

DETAILED DESCRIPTION

In the interests of clarity, the same elements will be designated by the same reference numbers in the different figures. It should also be noted that in FIGS. 2 to 7, the solid arrows represent axes of rotation of the thrusters, and that the lines including a hollow area represent axes of thrust of the thrusters; this representation being indicated in FIG. 2.

Figure 2:
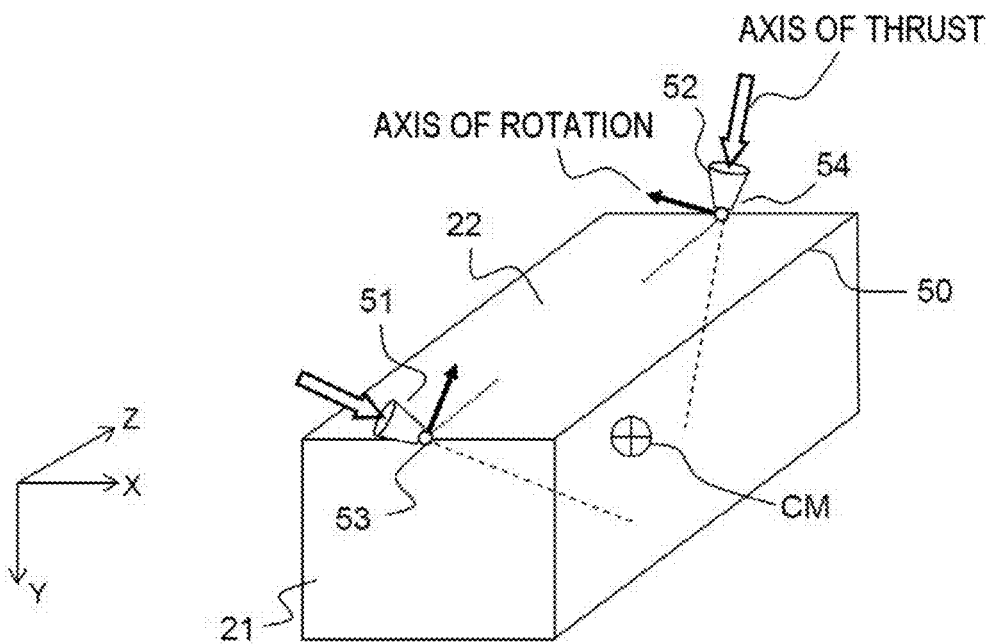
FIG. 2 shows a satellite equipped with a propulsion device according to a first alternative of the invention.

FIG. 2 shows a satellite equipped with a propulsion device according to a first alternative of the invention. The satellite includes a parallelepiped structure 50; a center of mass CM of the satellite being contained within the structure 50. In an operational configuration of the satellite in the orbit, the orientation of the satellite is maintained constant in relation to the Earth and is referenced by means of the reference axis system already introduced. This axis system includes a Z-axis directed towards the Earth, a Y-axis perpendicular to the orbit and oriented in the opposite direction to the angular momentum of the orbit, and an X-axis forming with Y and Z a direct orthogonal reference. The already introduced naming of the faces of the parallelepiped structure is also repeated; in particular, the structure 50 includes a North face 22 and an anti-Earth face 21.

With the aim of improving the overall effectiveness of the inclination control, the present invention eliminates the unwanted speed increments of the satellite according to the Z-axis by arranging two thrusters 51 and 52 on the same face of the satellite, the North face in FIG. 2, on either side of the center of mass CM according to the Z-axis. Through a suitable orientation of their respective thrusts, the thrusters thus arranged limit the unwanted force components according to the Z-axis, and mutually compensate for these components through a simultaneous ignition of the two thrusters. This simultaneous ignition results in a force, exerted on the center of mass CM, having a principal component according to the Y-axis, improving the effectiveness of the inclination control.

According to the embodiment shown in FIG. 2, a thruster 51 is arranged on the North face of the satellite structure, close to the anti-Earth face. A thruster 52 is arranged on the North face of the satellite structure, close to the Earth face 20. The thrusters 51 and 52 are arranged close to the middle of the edge common to the North and anti-Earth faces, and the North and Earth faces respectively. The two thrusters 51 and 52 are suitable for delivering a thrust according to one axis, referred to as the thrust axis.

Figure 1:
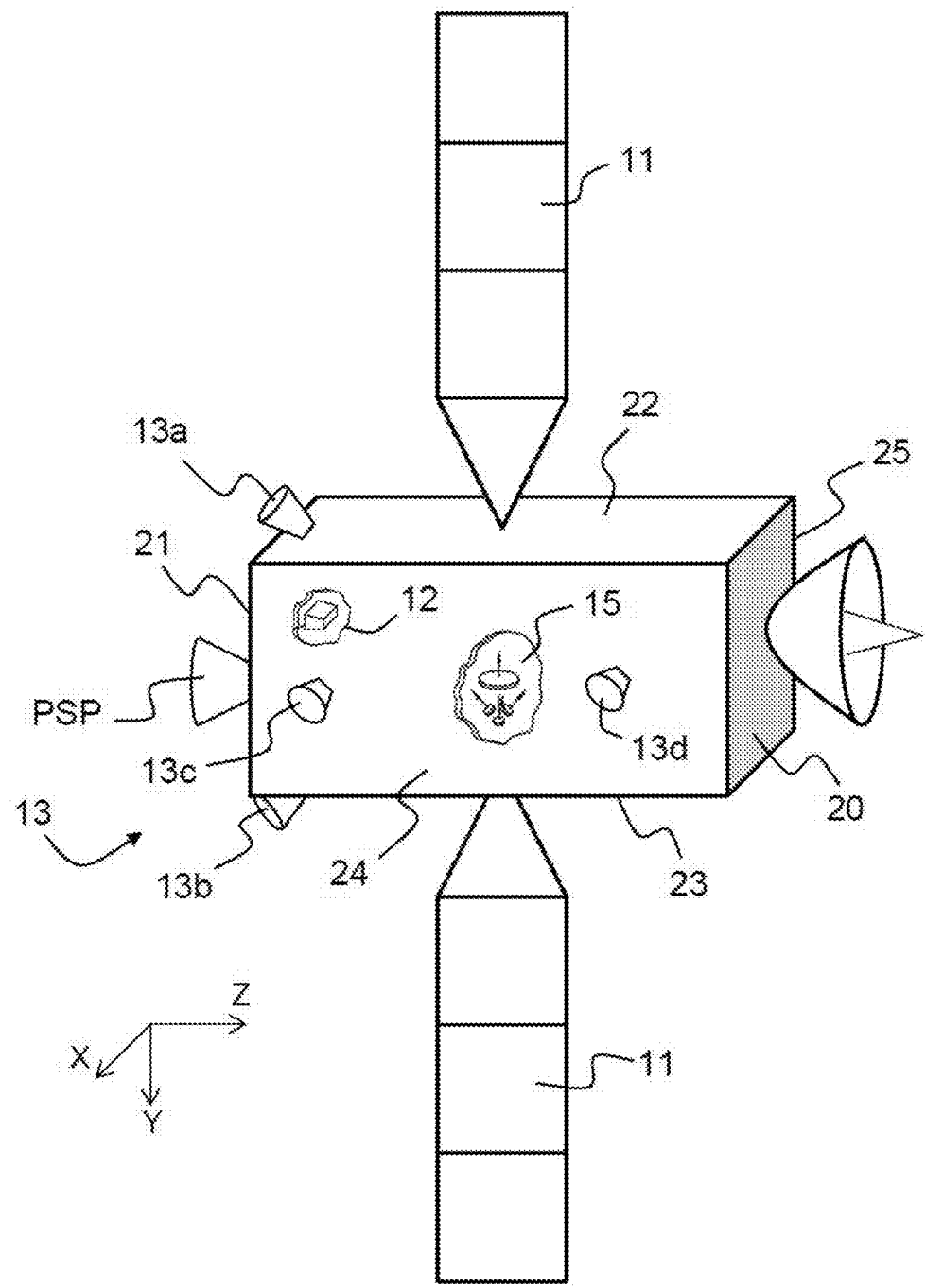
FIG. 1, already presented, shows a satellite with a current architecture and the main constituents of an orbit and attitude control system.

Each of the two thrusters 51 and 52 furthermore includes a motorized mechanism referenced 53 and 54 respectively, suitable for controlling the orientation of the thruster around an axis substantially perpendicular to both its thrust axis and the X-axis. According to FIG. 1, the thrust axis of the thrusters is not necessarily orientable towards the center of mass CM. The simultaneous ignition of the two thrusters means that it is no longer necessary to be able to apply a thrust to the center of mass for inclination control.

It must be noted that the two thrusters 51 and 52 are arranged in FIG. 2 on the North face of the structure of the satellite. In an alternative configuration, they can be disposed on the South face of the satellite. More broadly, the invention relates to a propulsion device including two thrusters fixed to the satellite on the same face of the structure, disposed on either side of the center of mass CM according to the Z-axis, and configured in such a way that a force resulting from the thrusts of the two simultaneously activated thrusters presents a principal component according to the Y-axis.

It has been indicated that each of the thrusters includes a motorized mechanism to control the orientation of the thruster around an axis substantially perpendicular to both its thrust axis and the X-axis. Substantially perpendicular is preferably understood to mean an axis forming an angle of less than 30° with the axis strictly perpendicular to the thrust axis and to the X-axis, in order to enable optimum benefit to be gained from the specified advantages of the present invention.

Through simultaneous ignition of the two thrusters close to the orbital node, the embodiment shown in FIG. 2 advantageously corrects the inclination of the orbit. It must be noted that, in practice, the thrust maneuver is not systematically carried out in the orbital node, but for a position in the orbit compensating for the wanted natural disturbance component. For optimization purposes, compensation for the effect of only non-periodic disturbances will be sought, rather than disturbances with a periodic effect and acceptable amplitude, with the aim of limiting the quantity of fuel consumed.

The embodiment shown in FIG. 2 furthermore enables the generation and control of the torques exerted on the structure through rotation of the thrusters around their respective axes. Typically, a switchover of the thrusters in the same direction in relation to the X-axis (i.e. either according to the positive direction of the X-axis, or according to its negative direction) furthermore enables, in addition to the movement of the satellite, the generation of a positive or negative torque around the Z-axis. A switchover of the thrusters in an opposite direction in relation to the X-axis (for example the thruster 51 according to the positive direction of the X-axis, and the thruster 52 according to the negative direction of the X-axis) enables, in addition to the movement of the satellite, the generation of a positive or negative torque around the Y-axis. It must also be noted that a differential ignition of the two thrusters, in duration or in intensity, also enables the generation of a positive or negative torque around the X-axis. The device configured in this way therefore enables both inclination control and an improved efficiency of the devices of the prior art, and the generation of torque according to the three axes of the satellite.

Figure 3:
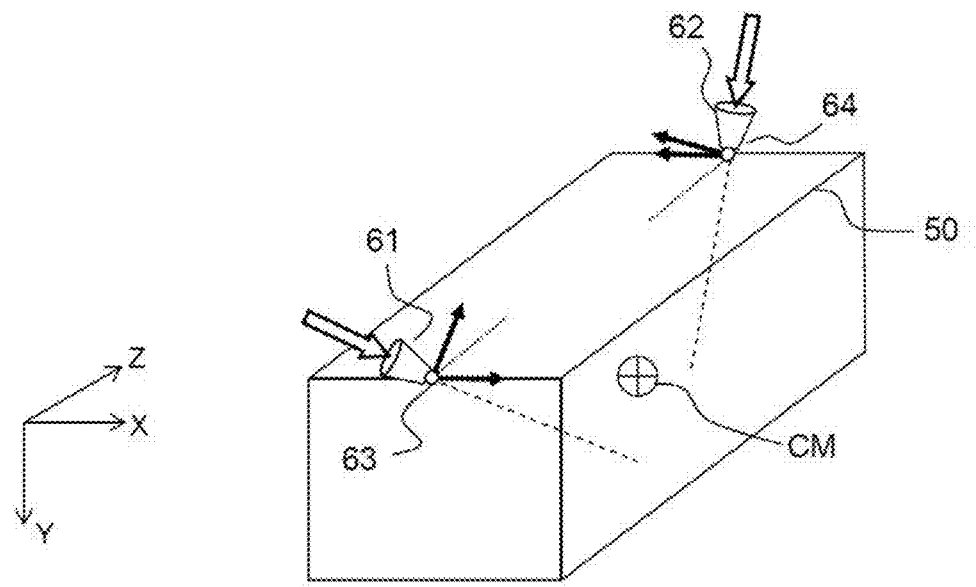
FIG. 3 shows a satellite equipped with a propulsion device according to a second alternative of the invention.

FIG. 3 shows a satellite equipped with a propulsion device according to a second alternative of the invention. In this alternative, the propulsion device includes two thrusters 61 and 62 arranged on the North face, close to the middle of the edge common to the anti-Earth face and close to the middle of the edge common to the Earth face respectively. The two thrusters 61 and 62 include a motorized mechanism, referenced 63 and 64 respectively, suitable for controlling the orientation of the thruster around two separate axes substantially perpendicular to its thrust axis. As previously, a substantially perpendicular axis is understood to mean an axis forming an angle of less than 30° with the strictly perpendicular axis, to enable optimum benefit to be gained from the specified advantages of the present invention. The motorized mechanisms 63 and 64 configured in this way enable the orientation of the thrust delivered by each thruster in the plane (Y, Z), in the direction of the center of mass CM or outside the center of mass.

According to the same principle as that described for FIG. 2, the embodiment shown in FIG. 3 enables inclination control and torque generation according to the three axes of the satellite. This embodiment furthermore corrects the eccentricity of the orbit. Typically, a switchover of the thruster 62 in the plane (Y, Z) in the positive direction of the Z-axis, combined with a prolongation of the duration of ignition of the thrusters, enables the generation of the same torque, and also a wanted force according to the Z-axis (in the negative direction of the Z-axis in this example; a force in the positive direction of the Z-axis being able to be generated by the thruster 61 according to the same principle). According to techniques well known to the person skilled in the art, this controllable force according to the Z-axis corrects the eccentricity according to the X-axis. According to these same techniques, it is also known that the control of the force according to the Z-axis, applied for various positions of the satellite in the orbit, enables the inclination control to be achieved and the eccentricity to be corrected according to the different axes.

FIGS. 4 to 7 show additional alternatives of the propulsion device according to the invention. These alternatives add one or more additional thrusters to the two thrusters described in the case of FIGS. 2 and 3. FIGS. 4 to 7 show two thrusters of the same type as the thrusters 51 and 52 shown in FIG. 2, i.e. of which the motorized mechanism enables the orientation of the thruster around a single axis. This representation is not limiting. The propulsion devices shown in FIGS. 4 to 7 can, in the same way, be implemented for two thrusters of the same type as the thrusters 61 and 62 shown in FIG. 3, i.e. of which the motorized mechanism enables the orientation of the thruster around two axes.

Figure 4:
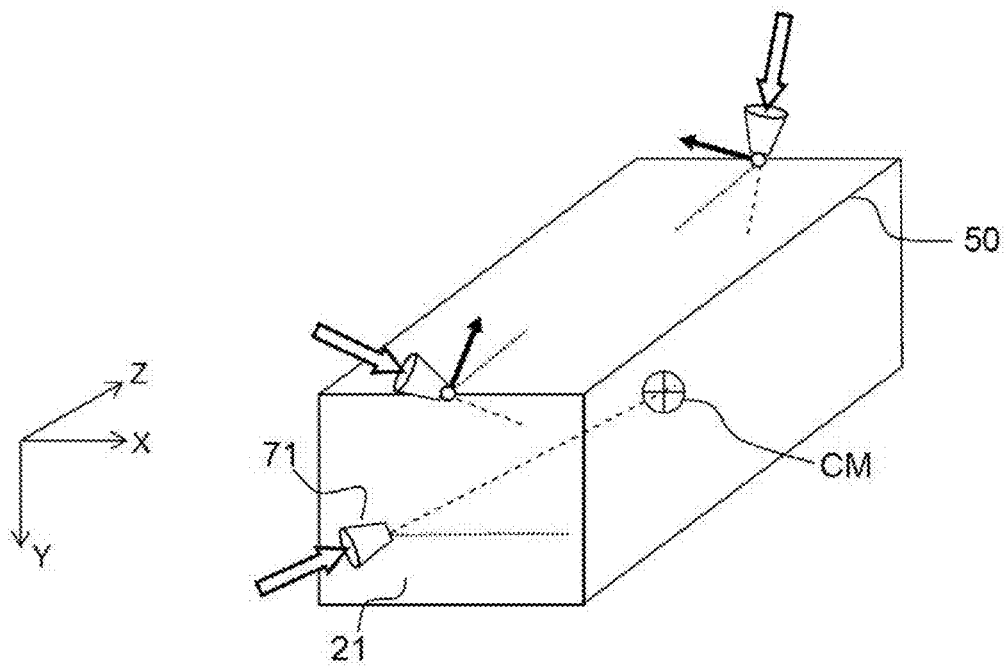
FIG. 4 shows a satellite equipped with a propulsion device according to a third alternative of the invention.

FIG. 4 shows a satellite equipped with a propulsion device according to a third alternative of the invention. In this alternative, the propulsion device includes an additional thruster 71 fixed on the structure 50, on the anti-Earth face in the embodiment shown in FIG. 4, and configured in such a way as to deliver a thrust in the direction of the center of mass CM according to an axis substantially perpendicular to the Y-axis. As previously, a substantially perpendicular axis is understood to mean an axis forming an angle of less than 30° with the strictly perpendicular axis, to enable maximum benefit to be gained from the specified advantages of the present invention. In the embodiment shown in FIG. 4, the additional thruster is arranged on the anti-Earth face and in a plane perpendicular to the Y-axis containing the center of mass of the satellite. In addition to the inclination control, this configuration of the propulsion device advantageously enables the performance of the orbit transfer from the low injection orbit following separation of the launching spacecraft to the, for example geostationary, mission orbit. The additional thruster configured in this way moves the satellite according to a trajectory perpendicular to the Y-axis during the orbit transfer. This capability is necessary in order to enable the use, during the orbit transfer, of the solar generators fixed on the North and South faces of the satellite and deployed parallel to the Y-axis.

When the satellite is in its mission orbit, the propulsion device according to this embodiment exerts forces in the plane of the orbit and represents a substantial component according to the X-axis. It then becomes possible to control eccentricity and drift by positioning the thruster 71 in such a way that it opposes the natural drift of the satellite, the direction and amount of which depend on its longitude.

Figure 5:
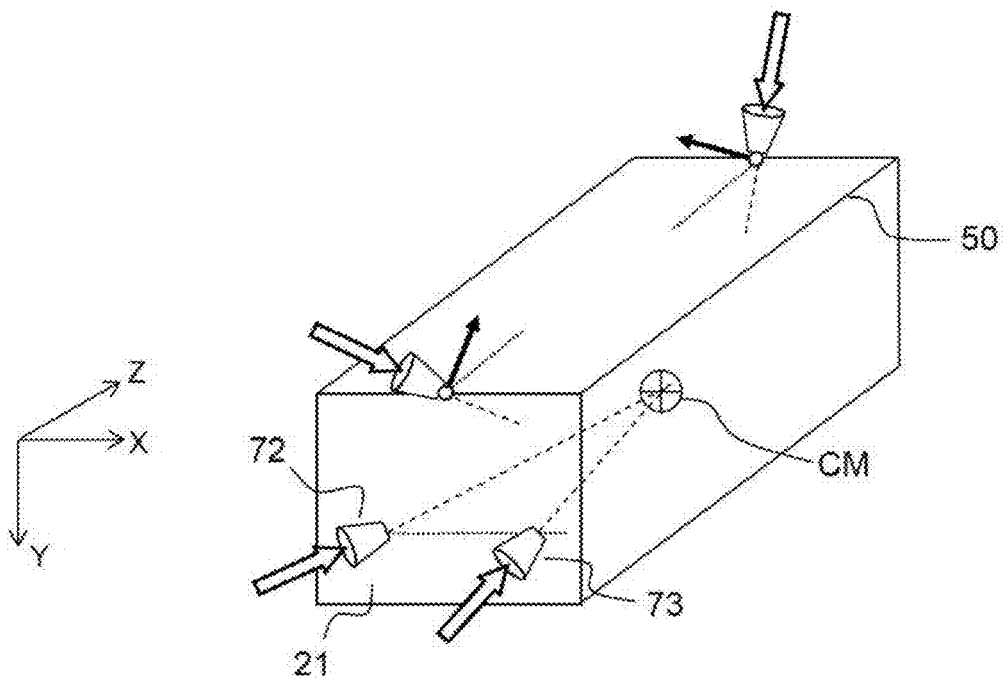
FIG. 5 shows a satellite equipped with a propulsion device according to a fourth alternative of the invention.

FIG. 5 shows a satellite equipped with a propulsion device according to a fourth alternative of the invention. In this alternative, the propulsion device includes two additional thrusters 72 and 73 fixed on the structure 50, on the anti-Earth face in the embodiment shown in FIG. 5, and configured in such a way as to deliver a thrust in the direction of the center of mass CM according to an axis substantially perpendicular to the Y-axis. The additional thrusters 72 and 73 are furthermore arranged on the structure 50 on either side of the center of mass CM according to the X-axis. As previously, a substantially perpendicular axis is understood to mean an axis forming an angle of less than 30° with the strictly perpendicular axis, to enable maximum benefit to be gained from the specified advantages of the present invention. In the embodiment shown in FIG. 5, the additional thrusters are arranged on the anti-Earth face 21 close to the middle of the edges common to the anti-Earth and West faces and the anti-Earth and East faces respectively. This configuration of the propulsion device provides inclination control and eccentricity control, and contributes to the orbit transfer according to the same principles as previously described for FIGS. 2 to 4. This configuration also provides control of the drift in the East and West. The additional thrusters 72 and 73 exert a force mainly in a plane (X, Z) with a substantial component which is positive and negative respectively according to the X-axis of the speed, i.e. in the plane of the orbit. Advantageously, this alternative of the propulsion device therefore provides complete control of the orbit.

When the satellite is in its mission orbit, the propulsion device according to this embodiment exerts forces in the plane of the orbit and represents a substantial component according to the X-axis, both in the positive direction and in the negative direction. It then becomes possible to control eccentricity and drift regardless of the natural drift of the satellite, i.e. regardless of its longitude.

Figure 6:
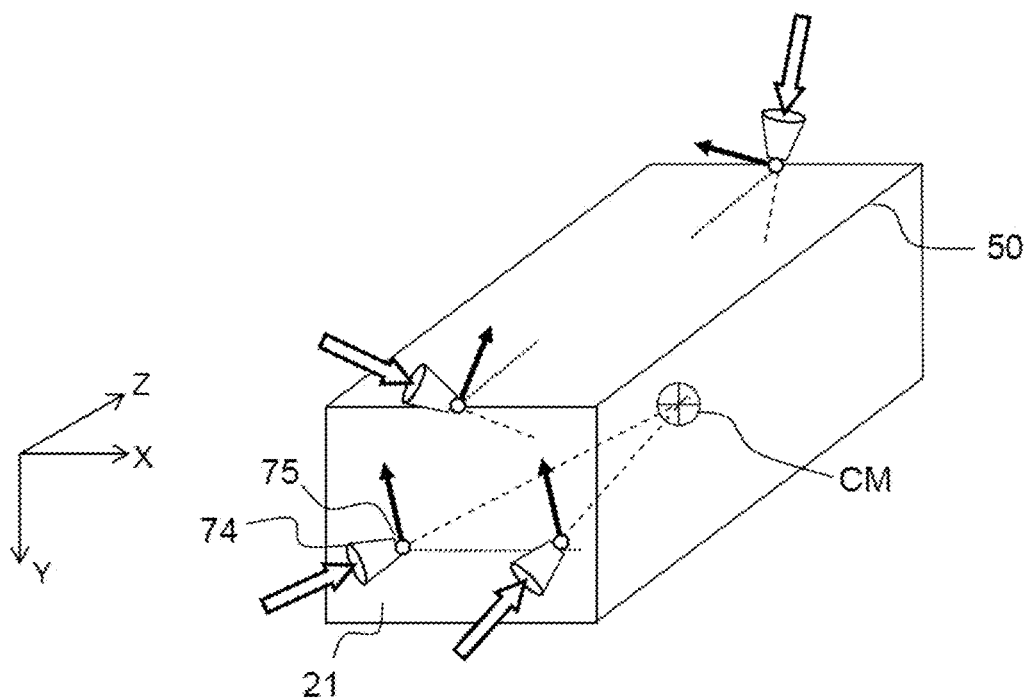
FIG. 6 shows a satellite equipped with a propulsion device according to a fifth alternative of the invention.
Figure 7:
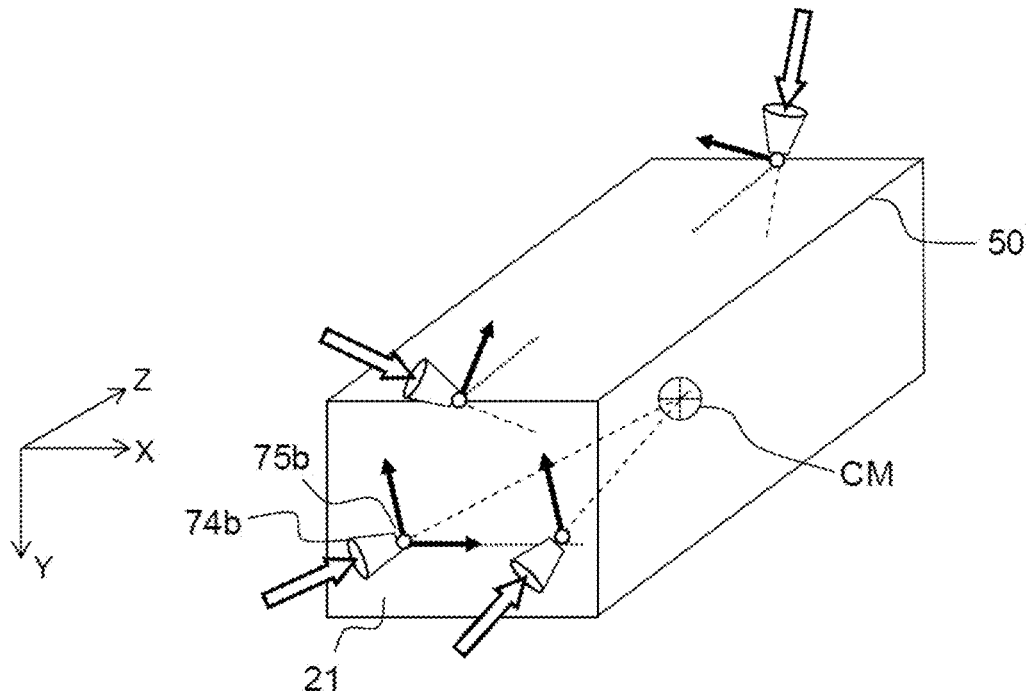
FIG. 7 shows a satellite equipped with a propulsion device according to a sixth alternative of the invention.

FIGS. 6 to 7 show two final alternatives of the propulsion device according to the invention. These two alternatives add a motorized mechanism to control the orientation of the additional thrusters. The propulsion devices shown in FIGS. 6 and 7 complement the propulsion device shown in FIG. 5, including two additional thrusters, in addition to the two thrusters fixed on the North face. This representation is not limiting. The motorized mechanisms of the additional thrusters that will be shown in detail in FIGS. 6 and 7 can be implemented in the same way for a propulsion device including only one single additional thruster, i.e. as shown in FIG. 4.

FIG. 6 shows a satellite equipped with a propulsion device according to a fifth alternative of the invention. In this alternative, the additional thruster 74 includes a motorized mechanism 75 suitable for controlling the orientation of the additional thruster 74 around an axis substantially perpendicular to its thrust axis. As previously, a substantially perpendicular axis is understood to mean an axis forming an angle of less than 30° with the strictly perpendicular axis, to enable optimum benefit to be gained from the specified advantages of the present invention. The propulsion device configured in this way advantageously enables orientation of the thrust delivered by the additional thruster 74 outside the center of mass CM of the satellite, to contribute to the attitude control of the satellite according to one axis; this orientation capability of the thruster controlling the torques in one direction.

FIG. 7 shows a satellite equipped with a propulsion device according to a sixth alternative of the invention. In this alternative, the additional thruster 74*b* includes a motorized mechanism 75*b* suitable for controlling the orientation of the additional thruster 74*b* around two separate axes substantially perpendicular to its thrust axis. As previously, a substantially perpendicular axis is understood to mean an axis forming an angle of less than 30° with the strictly perpendicular axis, to enable optimum benefit to be gained from the specified advantages of the present invention. The propulsion device configured in this way advantageously enables orientation of the thrust delivered by the additional thruster 74b outside the center of mass CM of the satellite, to contribute to the attitude control of the satellite according to one axis; this orientation capability of the thruster controlling the torques in one direction.

The propulsion device includes a plurality of thrusters according to the different alternatives described above. In a general manner, the architecture of the propulsion device according to the invention can be implemented by means of thrusters of any type. Chemical-propellant thrusters or plasma thrusters can notably be implemented. Thrusters of different types can also be used for the thrusters 51, 52, 61 and 62 providing inclination control and for the additional thrusters 71, 72, 73, 74 et 74b performing the other functions described above. In one preferred embodiment, the propulsion device includes Hall-effect plasma thrusters.

The alternatives of the propulsion device according to the invention are shown in FIGS. 2 to 7 in the case of a satellite of which the structure is parallelepiped-shaped. This characteristic does not represent a limitation to the present invention, which applies in the same way to any form of structure of the satellite. Thus, the invention relates more broadly to a propulsion device for controlling the orbit of an earth-orbit satellite, including a structure of which the orientation is maintained constant in relation to the Earth in an operational configuration of the satellite in the orbit; a center of mass of the satellite being contained in the structure of the satellite. The propulsion device includes two thrusters suitable for delivering a thrust according to one axis, and fixed to the structure of the satellite in the same half-space separated by the plane of the orbit. The thrusters are arranged on the structure on either side of a plane containing the center of mass and perpendicular to the Z-axis of the satellite oriented towards the Earth; the thrusters being configured in such a way that a force resulting from the thrusts of the two simultaneously activated thrusters presents a principal component according to a Y-axis of the satellite oriented perpendicular to the orbit.

The invention also relates to a geostationary-orbit satellite including a propulsion device having the previously described characteristics. Although the propulsion device described by the present invention relates primarily to geostationary telecommunications satellites, it can be applied more generally, under the same conditions and for the same advantages, to any type of earth-orbit satellite for which the inclination of the orbit is required to be controlled.

Finally, the invention relates to a method for controlling the inclination of the orbit for a geostationary satellite including a propulsion device having the previously described characteristics, and comprising a step consisting in simultaneously activating the two thrusters 51 and 52 (or 61 and 62) to perform a correction of the inclination of the orbit of the satellite.

The invention claimed is:

1. A propulsion device for controlling the orbit of an earth-orbit satellite, including a structure of which the orientation is maintained constant in relation to the Earth in an operational configuration of the satellite in the orbit; a center of mass of the satellite being contained in the structure of the satellite, the propulsion device comprising:

two thrusters, each thruster being suitable for delivering a thrust according to one axis, and being fixed to the structure of the satellite in the same half-space delimited by the plane of the orbit, and in that the thrusters are arranged on the structure and separated from each other by a plane containing the center of mass and perpendicular to a Z-axis of the satellite oriented towards the Earth;

the thrusters being configured in such a way that a force resulting from the thrusts of the two simultaneously activated thrusters represents a principal component according to a Y-axis of the satellite oriented perpendicular to the orbit, each of the two thrusters being configured to control the orientation of the thrust of said thruster around two axes substantially perpendicular to a thrust axis of said thruster.

2. The propulsion device according to claim 1, including at least one additional thruster, fixed on the structure, configured in such a way as to deliver a thrust in the direction of the center of mass according to an axis substantially perpendicular to the Y-axis.

3. The propulsion device according to claim 1, including two additional thrusters fixed on the structure; each of the additional thrusters being configured in such a way as to deliver a thrust in the direction of the center of mass according to an axis substantially perpendicular to the Y-axis; the additional thrusters furthermore being arranged on the structure on either side of the center of mass according to an axis perpendicular to both the Y-axis and the Z-axis.

4. The propulsion device according to claim 2, wherein said at least one additional thruster is configured to control the orientation of said at least one additional thruster around at least one axis substantially perpendicular to a thrust axis of the at least one additional thruster.

5. The propulsion device according to claim 2, wherein said at least one additional thruster is configured to control the orientation of said at least one additional thruster around two axes substantially perpendicular to a thrust axis of said at least one additional thruster.

6. The propulsion device according to claim 1, of which one of the thrusters is a Hall-effect plasma thruster.

7. A Geostationary-orbit satellite including a propulsion device according to claim 1.

8. A method for controlling the orbit inclination for geostationary satellites including a propulsion device according to claim 1, further comprising simultaneously activating the two thrusters to perform a correction of the inclination of the orbit of the satellite.

9. The propulsion device according to claim 1, including a single additional thruster, fixed on a face of the structure, configured in such a way as to deliver a thrust in the direction of the center of mass according to an axis substantially perpendicular to the Y-axis.

10. The propulsion device according to claim 2, wherein said at least one additional thruster is configured to control the orientation of said at least one additional thruster around a single axis substantially perpendicular to a thrust axis of the at least one additional thruster.

11. The propulsion device according to claim 3, wherein said two additional thrusters are configured to control the orientation of each of said two additional thruster around at least one axis substantially perpendicular to a thrust axis of said two additional thrusters.

12. The propulsion device according to claim 3 wherein said at least one additional thruster is configured to control the orientation of each of said two additional thruster around a single axis substantially perpendicular a thrust axis of said at least one additional thruster.

13. The propulsion device according to claim 3, wherein said two additional thrusters are configured to control the orientation of each of said two additional thruster around two axes substantially perpendicular to a thrust axis of the two additional thrusters.

14. The propulsion device according to claim 9, wherein said additional thruster is configured to control the orientation of said additional thruster around at least one axis substantially perpendicular to a thrust axis of the additional thruster.

15. The propulsion device according to claim 9, wherein said one additional thruster is configured to control the orientation of said additional thruster around two axes substantially perpendicular to a thrust axis of the additional thruster.

16. The propulsion device according to claim 9, wherein said additional thruster is configured to control the orientation of said additional thruster around a single axis substantially perpendicular to a thrust axis of the additional thruster.

* * * * *